(12) United States Patent
Peterson

(10) Patent No.: US 7,471,849 B2
(45) Date of Patent: Dec. 30, 2008

(54) METHODS AND APPARATUS FOR SHIFTING PERSPECTIVE IN A COMPOSITE IMAGE

(75) Inventor: John W. Peterson, Menlo Park, CA (US)

(73) Assignee: Adobe Systems Incorporated, San Jose, CA (US)

( * ) Notice: Subject to any disclaimer, the term of this patent is extended or adjusted under 35 U.S.C. 154(b) by 0 days.

(21) Appl. No.: 11/502,146

(22) Filed: Aug. 9, 2006

(65) Prior Publication Data

US 2006/0274972 A1 Dec. 7, 2006

Related U.S. Application Data

(63) Continuation of application No. 09/941,427, filed on Aug. 28, 2001, now Pat. No. 7,103,236.

(51) Int. Cl.
*G06K 9/40* (2006.01)

(52) U.S. Cl. .................... 382/275; 382/284
(58) Field of Classification Search ............ 345/427, 345/619–689, 582–588; 382/284, 293, 294, 382/275

See application file for complete search history.

(56) References Cited

U.S. PATENT DOCUMENTS

| | | |
|---|---|---|
| 4,057,338 A | 11/1977 | Yevick |
| 5,185,808 A | 2/1993 | Cok |
| 5,528,290 A | 6/1996 | Saund |
| 5,657,096 A | 8/1997 | Lukacs |
| 5,802,202 A | 9/1998 | Yamada et al. |
| 5,838,837 A | 11/1998 | Hirosawa et al. |
| 5,920,657 A | 7/1999 | Bender et al. |
| 5,963,664 A | 10/1999 | Kumar et al. |

(Continued)

FOREIGN PATENT DOCUMENTS

WO WO 98/02844 1/1998

(Continued)

OTHER PUBLICATIONS

Debevec et al., Modeling and Rendering Architecture from Photographs: A hybrid geometry-and image-based approach, 1996, ACM Press, pp. 11-20.*

(Continued)

*Primary Examiner*—Matthew C Bella
*Assistant Examiner*—Dennis Rosario
(74) *Attorney, Agent, or Firm*—Fish & Richardson P.C.

(57) ABSTRACT

Methods and apparatus for shifting perspective in a composite image derived from a plurality of images including a first image as a center of projection, and a modified version of a second image that is corrected for perspective distortion relative to the first image. A user input specifies a change in perspective to make the second image the center of projection. In response, a transformation is determined for mapping reference points in the modified version of the second image to reference points in the original, uncorrected second image. The transformation is applied to each of the plurality of images in the composite image, and the transformed images are merged to form a second composite image that has the second image as its center of projection. The methods and apparatus can be implemented as an interactive tool capable of changing perspective based on a single user input.

30 Claims, 4 Drawing Sheets

U.S. PATENT DOCUMENTS

| | | | |
|---|---|---|---|
| 5,986,668 | A | 11/1999 | Szeliski et al. |
| 5,987,164 | A | 11/1999 | Szeliski et al. |
| 6,005,545 | A | 12/1999 | Nishida et al. |
| 6,043,837 | A | 3/2000 | Driscoll, Jr. et al. |
| 6,075,905 | A | 6/2000 | Herman et al. |
| 6,078,701 | A | 6/2000 | Hsu et al. |
| 6,081,275 | A * | 6/2000 | Kojima ..................... 345/427 |
| 6,084,592 | A | 7/2000 | Shum et al. |
| 6,128,108 | A | 10/2000 | Teo |
| 6,222,551 | B1 * | 4/2001 | Schneider et al. .......... 345/419 |
| 6,246,413 | B1 | 6/2001 | Teo |
| 6,249,616 | B1 | 6/2001 | Hashimoto |
| 6,351,262 | B1 * | 2/2002 | Edmark ..................... 345/427 |
| 6,356,297 | B1 | 3/2002 | Cheng et al. |
| 6,385,349 | B1 | 5/2002 | Teo |
| 6,389,179 | B1 | 5/2002 | Katayama et al. |
| 6,411,742 | B1 | 6/2002 | Peterson |
| 6,424,351 | B1 | 7/2002 | Bishop et al. |
| 6,532,036 | B1 | 3/2003 | Peleg et al. |
| 6,535,650 | B1 | 3/2003 | Poulo et al. |
| 6,567,085 | B1 * | 5/2003 | Edmark ..................... 345/427 |
| 6,618,511 | B1 | 9/2003 | Mancuso et al. |
| 6,643,413 | B1 | 11/2003 | Shum et al. |
| 6,674,484 | B1 | 1/2004 | Boland et al. |
| 6,704,041 | B2 | 3/2004 | Katayama et al. |
| 6,714,689 | B1 | 3/2004 | Yano et al. |
| 6,778,207 | B1 | 8/2004 | Lee et al. |
| 7,006,707 | B2 | 2/2006 | Peterson |
| 7,095,905 | B1 | 8/2006 | Peterson |

FOREIGN PATENT DOCUMENTS

| | | |
|---|---|---|
| WO | WO 01/88838 | 11/2001 |

OTHER PUBLICATIONS

Rademacher et al., Multiple-Center-of Projection Images, 1998, ACM, pp. 199-206.*

Bergen et al., "A Three Frame Algorithm for Estimating Two-Component Image Motion," David Sarnoff Research Center, Subsidiary of SRI International, Princeton, NJ 08543-5300, pp. 1-24, 1992.

Burt, et al. "A Multiresolution Spline With Application to Image Mosaics," ACM Transactions on Graphics, vol. 2, No. 4, Oct. 1983, pp. 217-236.

Girod et al., "Direct Estimation of Displacement Histograms," OSA Meeting on Image Understanding and Machine Vision, Cape Cod, MA, Jun. 1989, pp. 1-4.

Heckbert, "Fundamentals of Texture Mapping and Image Warping," *Master's Thesis* under the direction of Carlo Séquin, Dept. of Electrical Engineering and Computer Science, University of California, Berkeley, California, Jun. 17, 1989, 86 pp.

Klette et al., "Computer Vision. Three-Dimensional Data From Images," Springer-Verlag Singapore Pte. Ltd. 1998, pp. 48-56.

Mann et al., "Virtual Bellows: Constructing High Quality Stills From Video," M.I.T. Media Laboratory Perceptual Computing Section Technical Report No. 259 Appears, Proc. First IEEE Int. Conf. On Image Proc. Austin, TX, Nov. 1994, pp. 1-5.

Porter, et al. "Compositing Digital Images," Computer Graphics, vol. 18, No. 3, Jul. 1984, pp. 253-259.

Shum, et al., "Rendering with Concentric Mosaics," (1999) Microsoft Research, pp. 299-306.

"Stitcher—High Resolution Panoramas—for Professionals Only!" http://www.realviz.com/products/stitcher/index.htm, Realviz, S.A. Jun. 15, 2000 (3 pages).

"Stitcher—Major Features and Benefits" http://www.realviz.com/products/stitcher/majorfeatures.htm, Realviz, S.A. Jun. 15, 2000 (2 Pages).

"Stitcher—Success Stories" http://www.realviz.com/products/stitcher/success.htm, Realviz, S.A. Jun. 15, 2000 (1 Page).

"Stitcher—Key Features" http://www.realviz.com/products/stitcher/mainfeatures.htm, Realviz, S.A. Jun. 15, 2000 (3 Pages).

Szeliski et al., "Creating Full View Panoramic Image Mosaics and Environment Maps," Microsoft Research, 8 pp., 1997.

Williams, "Pyramidal Parametrics," Computer Graphics, vol. 17, No. 3, Jul. 1983, pp. 1-11.

Xiong, et al. "Registration, Calibration and Blending in Creating High Quality Panoramas," Applications of Computer Vision, Proceedings of the Fourth IEEE Workshop, Los Alamitos, CA Oct. 19-21, 1998, pp. 69-74.

* cited by examiner

METHODS AND APPARATUS FOR SHIFTING PERSPECTIVE IN A COMPOSITE IMAGE

CROSS-REFERENCE TO RELATED APPLICATIONS

This application is a continuation application of and claims priority to U.S. application Ser. No. 09/941,427, filed on Aug. 28, 2001.

BACKGROUND

This invention relates to image processing techniques and tools for manipulating captured images. Image capture devices, such as cameras, can be used to capture an image of a section of a view, such as a section of the front of a house. The section of the view whose image is captured by a camera is known as the field of view of the camera. Adjusting a lens associated with a camera may increase the field of view. However, there is a limit beyond which the field of view of the camera cannot be increased without compromising the quality, or resolution, of the captured image. It is sometimes necessary to capture an image of a view that is larger than can be captured within the field of view of a camera. To do so, multiple overlapping images of segments of the view can be taken and the images can be joined together, or "merged," to form a composite image, which may sometimes be referred to as a panoramic image.

An image captured by a camera distorts the sizes of objects depicted in the image so that distant objects appear smaller than closer objects. The size distortion, which is known as perspective distortion, depends on the camera position, the pointing angle of the camera, and so forth. Consequently, an object depicted in two different images might not have the same size in the two images, because of perspective distortion.

SUMMARY

The invention provides methods and apparatus, including computer program apparatus, for allowing a user to interactively select the center of projection for a composite image. In general, in one aspect one aspect of the invention relates to computer-implemented methods and apparatus, including computer program apparatus, implementing techniques for shifting perspective in a composite image that is derived from multiple images. The composite image includes the first image as a center of projection and modified versions of at least one second image, each of which is corrected for perspective distortion relative to the first image. The techniques include receiving an instruction to shift perspective to change the center of projection of the composite image, determining a transformation for mapping a set of reference points in one of the modified images to a set of reference points in the original uncorrected version of that image, and transforming the first image and the modified version of the second image based on the transformation to generate a modified version of the first image and the second image.

Particular implementations can include one or more of the following features. The transformed images can be merged to form a second composite image that has the selected image as its center of projection. The composite image can include a modified version of a third image that is corrected for perspective distortion relative to the first image. The techniques can include transforming the modified version of the third image based on the transformation to derive a second modified version of the third image that is corrected for perspective distortion relative to the second image, and merging the modified version of the first image, the second image, and the second modified version of the third image to form a second composite image. The reference points can include four non-collinear and non-coincident points in the corresponding image. The images can each include a perimeter, and the reference can be vertices on the image perimeters. The first image can include a plurality of pixels and can have a perimeter that defines a set of vertices, and transforming the first image based on the transformation can include transforming the vertices of the first image, and transforming the pixels of the first image based on the transformation of the vertices.

The transformation can be represented as a transformation matrix. The transformation matrix can be derived from the vertices of the modified version of the second image, and can be further derived from the vertices of the original, uncorrected second image. The transformation matrix can map the coordinates of a set of corners of the modified version of the second images to corner points of the original, uncorrected second image. The reference points in the modified version of the second image can be corner points on a trapezoid formed by a perimeter of the modified version of the second image, and the reference points in the second image can be corner points on a rectangle formed by a perimeter of the second image. Transforming the modified version of the second image can alter the shape of a perimeter of the modified version of the second image by moving at least one reference point relative to at least one other reference point. The modified version of the second image can have a perimeter forming a trapezoid, and transforming the modified version of the second image can alter the perimeter of the modified version of the second image to form a rectangle. The instruction to shift perspective can be received as a single user input. The transformation can be determined and the images transformed automatically performed in response to the user input.

In general, in another aspect the invention relates to computer-implemented methods and apparatus, including computer program apparatus implementing image processing techniques. The techniques include providing a composite image derived from a plurality of images including a first image and a second image, where the first image is the a center of projection image and the second image is modified to correct for perspective distortion relative to the first image, receiving a single user input including an instruction to change the perspective of the composite image to make the second image the center of projection, and in response to the input, automatically determining a transformation for mapping a set of reference points in the modified version of the second image to a set of reference points in the second image, transforming each of the plurality of images based on the transformation to obtain the original, unmodified second image and a set of one or more images corrected for distortion relative to the second image, and merging the second image and the set of one or more images corrected for distortion relative to the second image to form a composite image that has the second image as its center of projection.

Determining perspective correction in a composite image by examining image contents can be computationally intensive. By contrast, determining perspective correction by remapping reference points, such as image corner points, is computationally efficient, and can be implemented as an interactive tool.

The details of one or more embodiments of the invention are set forth in the accompanying drawings and the description below. Other features, objects, and advantages of the invention will be apparent from the description and drawings, and from the claims.

BRIEF DESCRIPTION OF DRAWINGS

Like reference symbols in the various drawings indicate like elements.

DETAILED DESCRIPTION

Figure 1:
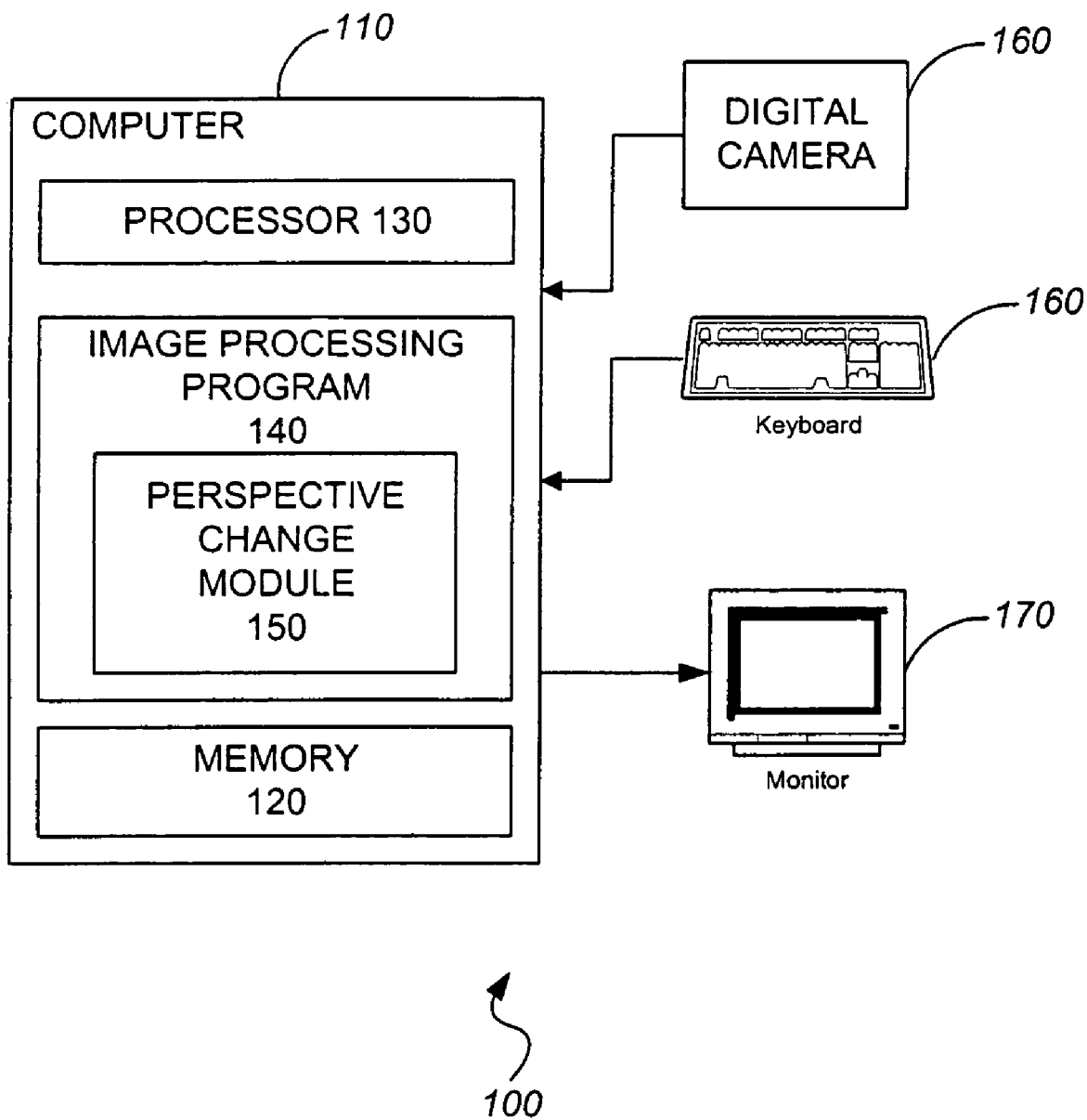
FIG. 1 is a block diagram illustrating an image processing system suitable for implementing an interactive tool to change perspective in a composite image.

FIG. 1 illustrates an image processing system 100 that includes a general-purpose programmable digital computer system 110 of conventional construction, including a memory 120 and a processor 130 for running an image processing program 140 that includes a perspective change module 150. Image processing system 100 also includes input devices 160, such as a keyboard, mouse, digitizing pen, digital camera or the like and output devices 170 such as a display monitor. Optionally, image processing system 100 also includes conventional communications hardware and software by which computer system 110 can be connected to other computer systems, such as over a network. In one implementation, image processing program 140 is implemented as a general purpose image processing program including image stitching software such as that disclosed in U.S. application Ser. Nos. 09/657,949 and 09/848,017, which are incorporated by reference herein.

Figure 2:
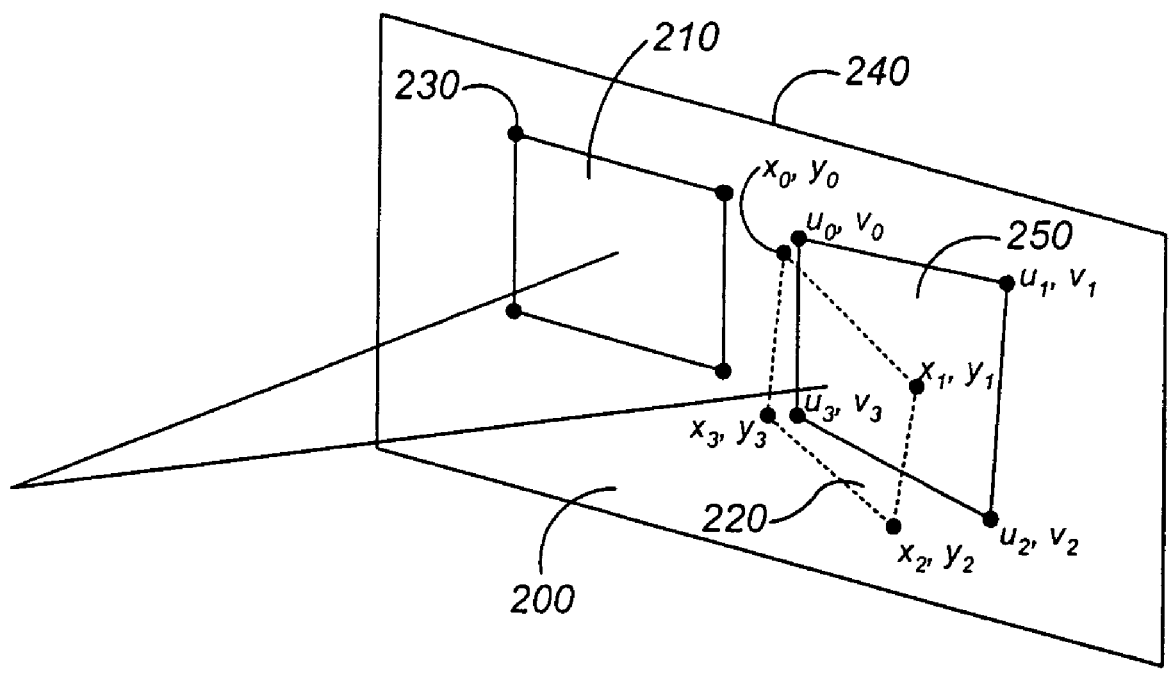
FIG. 2 is a representation of a simple composite image composed from two images.

FIG. 2 illustrates a simple composite image 200 derived from two images 210 and 220. In FIG. 2, images 210 and 220 are shown as not overlapping, although it will be understood that the methods and apparatus disclosed herein will typically be applied to images that overlap to some degree. Suitable images, which are typically rectangular arrays of pixels of known dimensions, may be obtained from any source and can be photographs, drawings or graphics created with or without the use of a computer, or images obtained by other conventional means. Preferably, each of the images has a perimeter that defines a set of vertices such as corners 230.

Image 210 represents one segment of a view, and is the center of projection in composite image 200. For example, image 210 can be derived from a photograph captured with a camera pointed in a first orientation, and can correspond to a projection of the corresponding segment of the view onto an image plane 240 that is separated from the camera by a distance corresponding to the focal length of the camera. Image 220 represents a second segment of the view, such as an image derived from a photograph captured after the camera is reoriented by rotating it relative to the first segment of the view. As a result of the reorientation of the camera, image 220 corresponds to a projection of the second segment of the view onto a different plane that is rotated relative to the first plane 240.

To correct for perspective distortion in composite image 200 resulting from the different image planes of images 210 and 220, image 220 is mapped onto the plane 240 of image 210 to form a modified version 250 of image 220. In one implementation, modified version 250 is generated using known techniques such as the virtual bellows method described in S. Mann et al., "Virtual Bellows: High Quality Stills from Video," Proceedings of the First IEEE International Conference on Image Processing, November 1994, which is incorporated by reference herein. Such techniques can transform an original, rectangular image into a modified, trapezoidal image as described in co-pending patent application Ser. No. 09/848,017, incorporated by reference above. Those skilled in the art will recognize that suitable perspective corrected composite images can be obtained from a variety of sources. For example, techniques for preparing composite images are discussed in co-pending U.S. application Ser. Nos. 09/657,949 and 09/848,017, which are incorporated by reference above.

Figure 3:
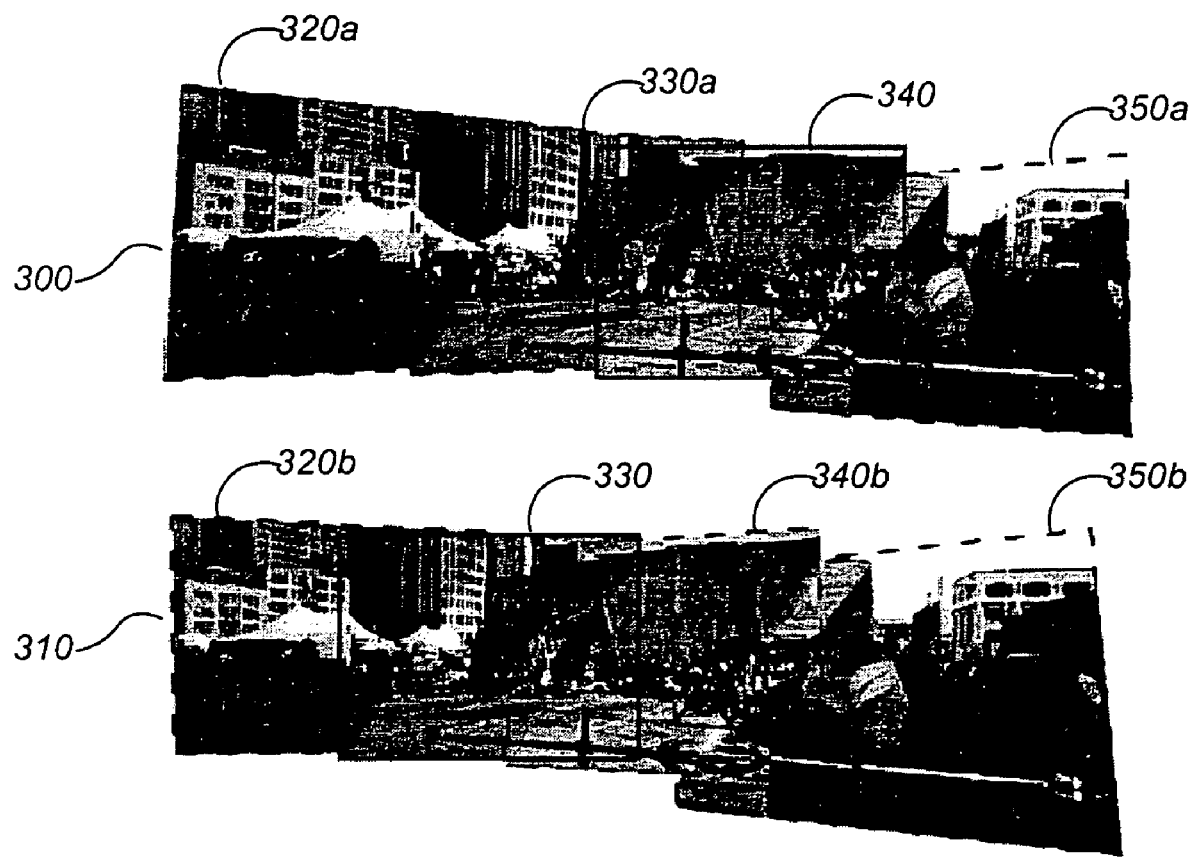
FIG. 3 illustrates two perspective corrected composite images derived from the same four images.

FIG. 3 illustrates two such composite images, composite images 300 and 310, each of which is derived from four images 320, 330, 340 and 350. In composite image 300, image 340 is the center of projection, and is therefore included in its original, rectangular form. Composite image 300 also includes modified versions of images 320, 330 and 350 (i.e., images 320a, 330a and 350a), each of which is corrected for perspective distortion relative to image 330. By contrast, in composite image 310, image 330 is the center of perspective (and is therefore included in its original, rectangular form), and the composite image includes modified versions 320b, 340b and 350b of images 320, 340 and 350, respectively. These modified versions are corrected for perspective distortion relative to image 330.

Figure 4:
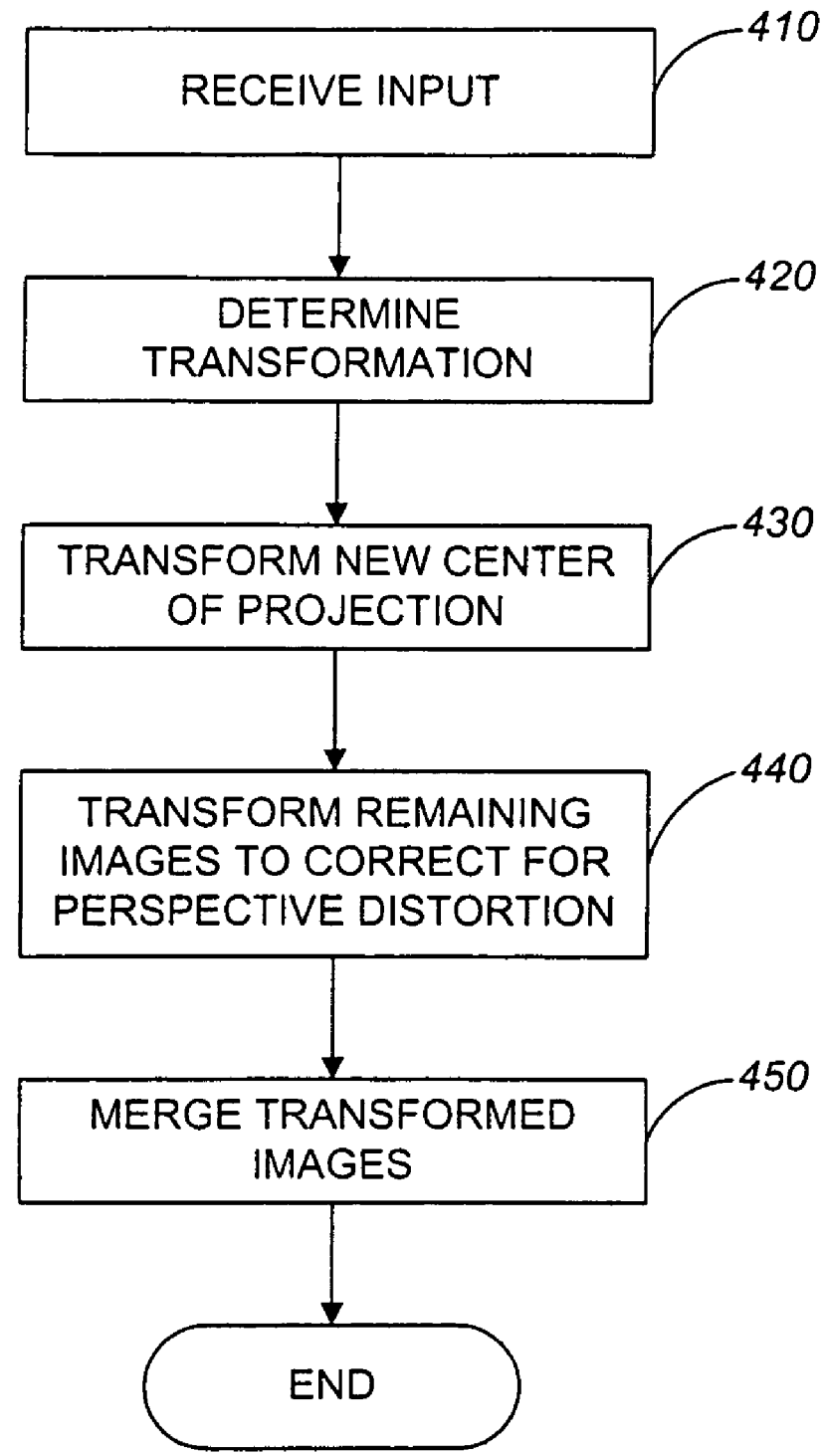
FIG. 4 is a flow diagram illustrating a method for changing perspective between two composite images such as those depicted in FIG. 3.

FIG. 4 illustrates a method 400 for shifting perspective in a composite image derived from multiple component images, such as composite image 300, which method can be implemented by perspective change module 150. The method begins when system 100, which is running an image processing program 140, receives an input specifying a change in perspective (step 410)—for example, an input specifying that the center of projection in composite image 300 (i.e., image 340) is to be shifted to image 330 (as in composite image 310). In one implementation, the input is a user input selecting an image in composite image 300 that is to become the center of projection in a new composite image. The user can select an image by, for example, employing a mouse or digitizing pen 160 to select the image displayed on a monitor 170. In one implementation, the user designates which image is to become the new center of projection using a single input, such as one keyboard stroke or one mouse click. Optionally, if system 100 determines that the user has selected an image that is the current center of projection of the composite image (e.g., by selecting image 340 in composite image 300), system 100 interprets the input as indicating that the first image is to remain the center of projection and the method ends.

Perspective change module 150 determines a transformation that will transform the selected modified, perspective corrected version (here, image 330a) of the image that is to become the center of projection into its original, unmodified form (i.e., image 330) (step 420). In a preferred implementation, the transformation maps a set of reference points in the selected modified version to a corresponding set of reference points in the original, unmodified image. The set of reference points for each image preferably includes four non-collinear, non-coincident points in the corresponding image, which points can be, but need not necessarily be, corner points or vertices in the image. Perspective change module 150 uses the transformation to transform the selected modified version to generate an original, unmodified version of the new center of projection (step 430). In one implementation, this can include transforming vertices of the selected modified version 330a and transforming the pixels of the selected modified version based on the transformation of the vertices. Perspective change module 150 similarly uses the transformation to transform each of the remaining images in composite image 300

(i.e., images 320*a*, 340 and 350*a*) to generate modified versions of those images that are corrected for perspective distortion relative to the new center of projection (image 330) (step 440). Image processing program 140 merges the resulting images 320*b*, 330, 340*b* and 350*b* to form composite image 310, in which image 330 is the center of projection (step 450), as discussed in U.S. application Ser. No. 09/848, 017, incorporated by reference above.

Mathematically, the transformation can be represented as a transformation matrix. In one implementation, the transformation matrix maps coordinates from a distorted, perspective corrected (e.g., trapezoidal) version of an image to an uncorrected, original image according to the method of Paul Heckbert, "Fundamentals of Texture Mapping and Image Warping," MS Thesis, U.C. Berkeley, 1989, which is incorporated by reference herein. The transformation matrix (M) can be given by:

$$M = \begin{bmatrix} q_4 - q_5 q_7 & q_5 q_6 - q_3 & q_3 q_7 - q_4 q_6 \\ q_2 q_7 - q_1 & q_0 - q_2 q_6 & q_1 q_6 - q_0 q_7 \\ q_1 q_5 - q_2 q_4 & q_2 q_3 - q_0 q_5 & q_0 q_4 - q_1 q_3 \end{bmatrix}$$

where:

$$\begin{bmatrix} q_0 \\ q_1 \\ q_2 \\ q_3 \\ q_4 \\ q_5 \\ q_6 \\ q_7 \end{bmatrix} = \begin{bmatrix} u_0 & v_0 & 1 & 0 & 0 & 0 & -u_0 x_0 & -v_0 x_0 \\ u_1 & v_1 & 1 & 0 & 0 & 0 & -u_1 x_1 & -v_1 x_1 \\ u_2 & v_2 & 1 & 0 & 0 & 0 & -u_2 x_2 & -v_2 x_2 \\ u_3 & v_3 & 1 & 0 & 0 & 0 & -u_3 x_3 & -v_3 x_3 \\ 0 & 0 & 0 & u_0 & v_0 & 1 & -u_0 y_0 & -v_0 y_0 \\ 0 & 0 & 0 & u_1 & v_1 & 1 & -u_1 y_1 & -v_1 y_1 \\ 0 & 0 & 0 & u_2 & v_2 & 1 & -u_2 y_2 & -v_2 y_2 \\ 0 & 0 & 0 & u_3 & v_3 & 1 & -u_3 y_3 & -v_3 y_3 \end{bmatrix}^{-1} \begin{bmatrix} x_0 \\ x_1 \\ x_2 \\ x_3 \\ y_0 \\ y_1 \\ y_2 \\ y_3 \end{bmatrix},$$

$(x_0, y_0)$, $(x_1, y_1)$, $(x_2, y_2)$, $(x_3, y_3)$ are coordinates of corner points (or other selected reference points) in the selected modified, perspective corrected version of the image that is to become the center of projection, and $(u_0, v_0)$, $(u_1, v_1)$, $(u_2, v_2)$, $(u_3, v_3)$ are coordinates of corner points (or corresponding reference points) in the original, unmodified version of the selected image. Transforming the selected modified version using the transformation matrix essentially resets that image to its original undistorted shape. Each of the remaining images in the composite image is corrected for perspective distortion relative to the new center of projection by mapping its corner points through the transformation matrix to produce new corner points.

The invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

A number of embodiments of the invention have been described. Nevertheless, it will be understood that various modifications may be made without departing from the spirit and scope of the invention. For example, while the steps of the various methods are described as being performed sequentially in a particular order, those skilled in the art will recognize that they can be performed in a different order and still fall within the scope of the invention. Accordingly, other embodiments are within the scope of the following claims.

What is claimed is:

1. A method comprising:

providing a first-perspective composite image, the first-perspective composite image being a composite of a plurality of first-perspective component images, the plurality of first-perspective component images including an original first image and a first-perspective second image, the original first image being a center of projection of the first-perspective composite image, the first-perspective second image having been corrected for perspective distortion relative to the original first image;

receiving an instruction to shift the perspective of the first-perspective composite image to make an original second image the center of projection of a second-perspective composite image;

determining a perspective transformation for mapping a set of reference points in the first-perspective second image to a corresponding set of reference points in the original second image; and applying the perspective transform to each of the plurality of first-perspective component images in the first-perspective composite image to generate the second-perspective composite image, including applying the perspective transform to the first-perspective second image to generate the original second image and applying the perspective transform to each other first-perspective component image of the plurality of first-perspective component images to generate respective second-perspective component images, the second-perspective component images being corrected for perspective distortion relative to the original second image, and each of the second-perspective component images having the original second image as their center of projection.

2. The method of claim 1, further comprising:

merging the second-perspective component images and the original second image to form the second-perspective composite image that has the original second image as its center of projection.

3. The method of claim 1, wherein the first-perspective component images include a first-perspective third image, the first-perspective third image being corrected for perspective distortion relative to the original first image, the method further comprising:
    transforming the first-perspective third image based on the perspective transform to derive a second-perspective third image, the second-perspective third image being corrected for perspective distortion relative to the original second image; and
    merging a second-perspective first image, the original second image, and the second-perspective third image to form the second-perspective composite image.

4. The method of claim 1, wherein:
    the reference points in the first-perspective second image include four non-collinear and non-coincident points in the first-perspective second image; and
    the reference points in the original second image include four non-collinear and non-coincident points in the original second image.

5. The method of claim 1, wherein:
    the second image and the first-perspective second image each include a perimeter; and
    the reference points in the original second image and the first-perspective second image are vertices on the perimeters of the original second image and the first-perspective second image.

6. The method of claim 1, wherein:
    the reference points in the first-perspective second image are corner points on a trapezoid formed by a perimeter of the first-perspective second image; and
    the reference points in the original second image are corner points on a rectangle formed by a perimeter of the original second image.

7. The method of claim 1, wherein:
    applying the perspective transform to the first-perspective second image alters the shape of a perimeter of the first-perspective second image by moving at least one reference point relative to at least one other reference point.

8. The method of claim 1, wherein:
    the first-perspective second image has a perimeter forming a trapezoid; and
    transforming the first-perspective second image alters the perimeter of the first-perspective second image to form a rectangle.

9. The method of claim 1, wherein:
    the instruction to shift perspective is received as a single user input; and
    the determining a transformation and applying the transform are automatically performed in response to the user input.

10. A computer-implemented image processing method, comprising:
    providing a first-perspective composite image, the first-perspective composite image being a composite of a plurality of first-perspective component images, the plurality of first-perspective component images including an original first image and a first-perspective second image, the original first image being a center of projection of the first-perspective composite image, the first-perspective second image having been corrected for perspective distortion relative to the original first image;
    receiving a single user input including an instruction to change a perspective of the first-perspective composite image to make an original second image the center of projection of a second-perspective composite image; and
    in response to the input, automatically:
        determining a perspective transformation for mapping a set of reference points in the first-perspective second image to a set of reference points in the original second image;
        applying the perspective transform to each of the plurality of first-perspective component images in the first-perspective composite image to generate the second-perspective composite image, including applying the perspective transform to the first-perspective second image to generate the original second image and applying the perspective transform to each other first-perspective component image of the plurality of first-perspective component images to generate respective second-perspective component images, the second-perspective component images being corrected for perspective distortion relative to the second image, and each of the second-perspective component images having the original second image as their center of projection; and
        merging the original second image and the second-perspective component images corrected for perspective distortion relative to the original second image to form the second-perspective composite image that has the original second image as its center of projection.

11. A computer program product, tangibly stored on a computer-readable medium, for shifting a perspective of a composite image, the product comprising instructions operable to cause a programmable processor to:
    provide a first-perspective composite image, the first-perspective composite image being a composite of a plurality of first-perspective component images, the plurality of first-perspective component images including an original first image and a first-perspective second image, the original first image being a center of projection of the first-perspective composite image, the first-perspective second image having been corrected for perspective distortion relative to the original first image;
    receive an instruction to shift the perspective of the first-perspective composite image to make an original second image the center of projection of a second-perspective composite image;
    determine a perspective transformation for mapping a set of reference points in the first-perspective second image to a corresponding set of reference points in the original second image; and
    apply the perspective transform to each of the plurality of first-perspective component images in the first-perspective composite image to generate the second-perspective composite image, including applying the perspective transform to the first-perspective second image to generate the original second image and applying the perspective transform to each other first-perspective component image of the plurality of first-perspective component images to generate respective second-perspective component images, the second-perspective component images being corrected for perspective distortion relative to the original second image, and each of the second-perspective component images having the original second image as their center of projection.

12. The computer program product of claim 11, further comprising instructions operable to cause a programmable processor to:
    merge the second-perspective component images and the original second image to form the second-perspective composite image that has the original second image as its center of projection.

13. The computer program product of claim 11, wherein the first-perspective component images include a first-perspective third image, the first-perspective third image being corrected for perspective distortion relative to the original first image, the product further comprising instructions operable to cause a programmable processor to:
   transform the first-perspective third image based on the perspective transform to derive a second-perspective third image, the second-perspective third image being corrected for perspective distortion relative to the original second image; and
   merge a second-perspective first image, the original second image, and the second-perspective third image to form the second-perspective composite image.

14. The computer program product of claim 11, wherein:
   the reference points in the first-perspective second image include four non-collinear and non-coincident points in the first-perspective second image; and
   the reference points in the original second image include four non-collinear and non-coincident points in the original second image.

15. The computer program product of claim 11, wherein:
   the second image and the first-perspective second image each include a perimeter; and
   the reference points in the original second image and the first-perspective second image are vertices on the perimeters of the original second image and the first-perspective second image.

16. The computer program product of claim 11, wherein:
   the reference points in the first-perspective second image are corner points on a trapezoid formed by a perimeter of the first-perspective second image; and
   the reference points in the original second image are corner points on a rectangle formed by a perimeter of the original second image.

17. The computer program product of claim 11, wherein:
   the instructions operable to cause a programmable processor to apply the perspective transform to the first-perspective second image are operable to cause the programmable processor to alter the shape of a perimeter of the first-perspective second image by moving at least one reference point relative to at least one other reference point.

18. The computer program product of claim 11, wherein:
   the first-perspective second image has a perimeter forming a trapezoid; and
   the instructions operable to cause a programmable processor to transform the first-perspective second image are operable to cause the programmable processor to alter the perimeter of the first-perspective second image to form a rectangle.

19. The computer program product of claim 11 wherein:
   the instruction to shift perspective is received as a single user input; and
   the product includes instructions to cause the programmable processor to determine the transformation and transform the images automatically in response to the user input.

20. A computer program product, tangibly stored on a computer-readable medium, comprising instructions operable to cause a programmable processor to:
   receive a first-perspective composite image, the first-perspective composite image being a composite of a plurality of first-perspective component images, the plurality of first-perspective component images including an original first image and a first-perspective second image, the original first image being a center of projection of the first-perspective composite image, the first-perspective second image having been corrected for perspective distortion relative to the original first image;
   receive a single user input including an instruction to change a perspective of the first-perspective composite image to make an original second image the center of projection of a second-perspective composite image; and
   in response to the input, automatically:
      determine a perspective transformation for mapping a set of reference points in the first-perspective second image to a set of reference points in the original second image;
      apply the perspective transform to each of the plurality of first-perspective component images in the first-perspective composite image to generate the second-perspective composite image, including applying the perspective transform to the first-perspective second image to generate the original second image and applying the perspective transform to each other first-perspective component image of the plurality of first-perspective component images to generate respective second-perspective component images, the second-perspective component images being corrected for perspective distortion relative to the second image, and each of the second-perspective component images having the original second image as their center of projection; and
      merge the original second image and the second-perspective component images corrected for perspective distortion relative to the original second image to form the second-perspective composite image that has the original second image as its center of projection.

21. A system comprising:
   a user interface device; and
   one or more computers operable to interact with the user interface device and to perform operations including:
      providing a first-perspective composite image, the first-perspective composite image being a composite of a plurality of first-perspective component images, the plurality of first-perspective component images including an original first image and a first-perspective second image, the original first image being a center of projection of the first-perspective composite image, the first-perspective second image having been corrected for perspective distortion relative to the original first image;
      receiving an instruction to shift the perspective of the first-perspective composite image to make an original second image the center of projection of a second-perspective composite image;
      determining a perspective transformation for mapping a set of reference points in the first-perspective second image to a corresponding set of reference points in the original second image; and
      applying the perspective transform to each of the plurality of first-perspective component images in the first-perspective composite image to generate the second-perspective composite image, including applying the perspective transform to the first-perspective second image to generate the original second image and applying the perspective transform to each other first-perspective component image of the plurality of first-perspective component images to generate respective second-perspective component images, the second-perspective component images being corrected for perspective distortion relative to the second image, and each of the second-perspective component images having the original second image as their center of projection.

22. The system of claim 21, where the one or more computers are further operable to perform operations including:
merging second-perspective images and the original second image to form the second-perspective composite image that has the original second image as its center of projection.

23. The system of claim 21, wherein the first-perspective component images include a first-perspective third image, the first-perspective third image being corrected for perspective distortion relative to the original first image, the one or more computers further operable to perform operations including:
transforming the first-perspective third image based on the perspective transform to derive a second-perspective third image, the second-perspective third image being corrected for perspective distortion relative to the original second image; and
merging a second-perspective first image, the original second image, and the second-perspective third image to form the second-perspective composite image.

24. The system of claim 21, wherein:
the reference points in the first-perspective second image include four non-collinear and non-coincident points in the first-perspective second image; and
the reference points in the original second image include four non-collinear and non-coincident points in the original second image.

25. The system of claim 21, wherein:
the second image and the first-perspective second image each include a perimeter; and
the reference points in the original second image and the first-perspective second image are vertices on the perimeters of the original second image and the first-perspective second image.

26. The system of claim 21, wherein:
the reference points in the first-perspective second image are corner points on a trapezoid formed by a perimeter of the first-perspective second image; and
the reference points in the original second image are corner points on a rectangle formed by a perimeter of the original second image.

27. The system of claim 21, wherein:
the operations further include applying the perspective transform to the first-perspective second image alter the shape of a perimeter of the first-perspective second image by moving at least one reference point relative to at least one other reference point.

28. The system of claim 21, wherein:
the first-perspective second image has a perimeter forming a trapezoid; and
the operations farther include transforming the first-perspective second image alter the perimeter of the first-perspective second image to form a rectangle.

29. The system of claim 21, wherein:
the instruction to shift perspective is received as a single user input; and
the determining a transformation and applying the transform are automatically performed in response to the user input.

30. A system, comprising:
means for providing a first-perspective composite image, the first-perspective composite image being a composite of a plurality of first-perspective component images, the plurality of first-perspective component images including an original first image and a first-perspective second image, the original first image being a center of projection of the first-perspective composite image, the first-perspective second image having been corrected for perspective distortion relative to the original first image;
means for receiving a single user input including an instruction to change a perspective of the first-perspective composite image to make an original second image the center of projection of a second-perspective composite image, including in response to the input, automatically:
determining a perspective transformation for mapping a set of reference points in the first-perspective second image to a set of reference points in the original second image;
applying the perspective transform to each of the plurality of first-perspective component images in the first-perspective composite image to generate the second-perspective composite image, including applying the perspective transform to the first-perspective second image to generate the original second image and applying the perspective transform to each other first-perspective component image of the plurality of first-perspective component images to generate respective second-perspective component images, the second-perspective component images being corrected for perspective distortion relative to the second image, and each of the second-perspective component images having the original second image as their center of projection; and
merging the original second image and the second-perspective component images corrected for perspective distortion relative to the original second image to form the second-perspective composite image that has the original second image as its center of projection.

* * * * *

UNITED STATES PATENT AND TRADEMARK OFFICE
CERTIFICATE OF CORRECTION

| | | |
|---|---|---|
| PATENT NO. | : 7,471,849 B2 | Page 1 of 1 |
| APPLICATION NO. | : 11/502146 | |
| DATED | : December 30, 2008 | |
| INVENTOR(S) | : John W. Peterson | |

It is certified that error appears in the above-identified patent and that said Letters Patent is hereby corrected as shown below:

In the Specification:
    column 1, line 9:
        delete "28, 2001.", and replace with --28, 2001, now Patent No. 7,103,236.--

Claim 28:
    column 12, line 1:
        delete "farther", and replace with --further-- column 12, line 2:
        insert --to--, before "alter"

Signed and Sealed this
Sixth Day of November, 2012

David J. Kappos
*Director of the United States Patent and Trademark Office*